3,121,110
PROCESS FOR PREPARING VINYL THIOETHERS
Edward M. La Combe, Charleston, and Byron Stewart, South Charleston, W. Va., assignors to Union Carbide Corporation, a corporation of New York
No Drawing. Filed Dec. 16, 1960, Ser. No. 76,150
19 Claims. (Cl. 260—491)

This invention relates to a novel process for producing vinyl thioethers. More specifically this invention relates to a process for producing vinyl thioethers which comprises the pyrolysis of 2-(organothio)ethyl acetates having the general formula:

$$R-S-CH_2CH_2-O-\overset{O}{\underset{\|}{C}}CH_3$$

wherein R can be an alkyl, aryl, or acetoxyethyl radical.

Vinyl thioethers are well known in the art. They have been used as plasticizers for various synthetic resins and as regulators or promoters in the peroxide catalyzed polymerization of monoethylenically unsaturated monomers of the vinylidene type such as for example vinylidene halides, vinyl halides, vinyl esters, styrene and the like. Vinyl thioethers can readily be homopolymerized or copolymerized with other monoethylenically unsaturated monomers such as for example those mentioned above. Homopolymers and copolymers of vinyl thioethers are suitable for a wide variety of uses in the fiber, molding, casting, coating and textile treating industries. The polymers also find utility as additives to fuel oil and lubricating oil formulations.

Numerous methods for the preparation of vinyl thioethers have been described in the prior art. For instance, it is well known that vinyl thioethers may be prepared by the dehydrohalogenation of a beta-halogenated sulfide such as $(CH_2ClCH_2)_2S$ (mustard gas). This process is commercially unattractive because of the obvious inherent toxicity of the starting materials used. Doumani (U.S. Patents 2,532,612 and 2,402,878) has described the preparation of vinyl thioethers by removing water from a beta hydroxy sulfide such as ethyl hydroxyethyl sulfide at high temperatures and in the presence of an inorganic dehydration catalyst, preferably solid alkali metal hydroxides. While this process produces fairly good yields of some vinyl thioethers, it is also considered commercially unattractive because of the fact that many of the products may be recovered only in polymeric form and because undesirably large amounts of catalyst are necessary. Schneider in U.S. Patent 2,890,244 discloses a process for preparing vinyl thioethers by reacting acetylene with an isothiouranium salt in the presence of a strong base catalyst. This process suffers from the disadvantages of requiring the extremely dangerous reactant acetylene and the necessity of relatively high reaction pressures.

It is an object of this invention to provide a novel process for the preparation of vinyl thioethers.

It is another object of this invention to provide a novel process for the preparation of vinyl thioethers which process does not require the use of expensive, toxic, or dangerously explosive starting materials or reactants.

It is still another object of this invention to provide a novel process for the preparation of vinyl thioethers which does not require the use of a catalyst.

Further objects of this invention will be apparent in light of the following specification and claims.

This invention is based on the discovery that vinyl thioethers can be produced by pyrolyzing a 2-(organothio) ethyl acetate of the general formula shown above.

The terms "pyrolyze" and "pyrolyzing" as used herein mean heating the 2-(organothio)ethyl acetate starting material to a temperature sufficient to decompose at least a portion of said acetate, thus forming the vinyl thioether product and acetic acid. The pyrolysis proceeds in accordance with the following general reaction equation:

$$R-S-CH_2CH_2-O-\overset{O}{\underset{\|}{C}}CH_3 \rightarrow R_1-S-CH=CH_2 + CH_3COOH$$

wherein R can be an alkyl, aryl, or acetoxyethyl radical and $R_1$ can be alkyl, aryl, acetoxyethyl or vinyl. For example, when 2-(methylthio)ethyl acetate is the starting material, the equation is:

$$CH_3-S-CH_2CH_2-O-\overset{O}{\underset{\|}{C}}CH_3 \rightarrow CH_3-S-CH=CH_2+CH_3COOH$$

As previously noted the starting materials used in the practice of this invention have the general formula:

$$R-S-CH_2CH_2-O-\overset{O}{\underset{\|}{C}}CH_3$$

R may be any one of a number of alkyl or aryl radicals including for example methyl, ethyl, propyl, isopropyl, butyl, isobutyl, sec-butyl, pentyl, hexyl, heptyl, benzyl, phenyl, tolyl, naphthyl, xylyl and the like. R may also represent an acetoxyethyl radical, in which case the starting material is the diester 2,2'-thiodiethyl diacetate or bis(acetoxyethyl)sulfide having the formula:

$$CH_3\overset{O}{\underset{\|}{C}}OCH_2CH_2-S-CH_2CH_2O\overset{O}{\underset{\|}{C}}CH_3$$

The monoester starting materials can be prepared by the reaction of an alkyl or aryl halide with 2-(mercapto) ethanol followed by esterification with acetic acid. The diester starting material is readily prepared by esterification of 2,2'-thiodiethanol (also known as bis(hydroxyethyl)sulfide) with acetic acid.

In general the process of this invention comprises heating a 2-(organothio)ethyl acetate starting material to a temperautre greater than about 350° centigrade and maintaining the starting material above that temperature until acetic acid is split out of at least a portion of the said starting material. The vinyl thioether product can then be recovered in any conventional manner such as, for example, by decantation, centrifugation, or fractional distillation. The preferred method of recovering the vinyl thioether product is by fractionally distilling the product mass.

The minimum temperature required for pyrolysis is 350° centigrade. For most efficient operation and best product yield it is preferred to maintain the starting material at a temperature between about 390° centigrade and about 490° centigrade. Especially preferred temperatures for the practice of this invention are within the range of from about 450° to about 470° centigrade, such temperatures providing optimum yields and efficiency.

It will be readily apparent to those skilled in the art that the period of time required for pyrolysis to occur will depend upon the reaction temperature. At lower temperatures within the above-mentioned limits longer times will be required before pyrolysis and/or complete reaction can take place. As temperature is increased the time required for pyrolysis and/or complete reaction will decrease. The most economical reactions insofar as temperature, time, yield and efficiency are concerned occur when the temperature is maintained within the previously mentioned especially preferred range of from about 450° to about 470° centigrade.

Any suitable apparatus can be used for performing the process of this invention. It is preferred to operate the process in a continuous manner and for this purpose the preferred reaction apparatus is a one inch stainless steel tube. Although the process can be satisfactorily performed in a free space reactor it is preferred that the reactor be filled with an inert packing material in order to obtain optimum heat transfer. No catalyst is necessary for the practice of the process of this invention.

Various materials may be used as the inert packing such as for example glass beads, ceramic saddles, wire screens and the like. The preferred inert packing material is Filtros, a (granular) material consisting of low surface sintered glass and sand. The inert packing material usually remains in good condition during the pyrolysis reaction. It is preferred, however, for best reaction efficiency to periodically place fresh, unused packing material in the reactor.

Continuous operation entails preparing a reaction zone maintained at a temperature above 350° centigrade and preferably containing an inert packing material as explained hereinabove; continuously feeding into the reaction zone the 2-(organothio)ethyl acetate starting material; retaining the starting material in the reaction zone for a period of time sufficient to permit at least partial pyrolysis thereof; continuously collecting the reaction products exiting from the reaction zone, and recovering from the product mass the vinyl thioether produced. The collection of vaporous products is readily accomplished by ordinary condensation. As previously stated the preferred method of recovering the vinyl thioether product from the reaction product mass is by fractional distillation.

It will be obvious to those skilled in the art that the time required for pyrolysis to occur in the continuous process described above will vary according to the particular starting material and reaction temperature chosen. When operating within the broad limits of temperature disclosed hereinabove and when employing an inert packing material it has been observed that reaction times corresponding to feed rates of from about 50 grams to about 400 grams of starting material per liter of packing material per hour can be used. Preferred feed rates are within the range of from about 100 grams to about 300 grams per liter of packing material per hour. When the process is performed in an unfilled reactor feed rates will be within the range of from about 25 grams to about 200 grams of starting material per liter of reactor volume per hour. Specific feed rates for obtaining optimum results with any particular starting material can be readily determined by routine empirical test runs.

It should also be noted that although product yield in any single pass through the reactor may not be very great, it is a relatively simple operation to recover and recycle unreacted starting material and thus materially increase the process efficiency.

The invention will be more fully understood by reference to the following specific examples. These examples are merely illustrative of the practice of this invention and are not intended to limit the invention in any manner other than as defined in the appended claims.

EXAMPLES 1–4

*Preparation of 2-(Vinylthio)Ethyl Acetate*

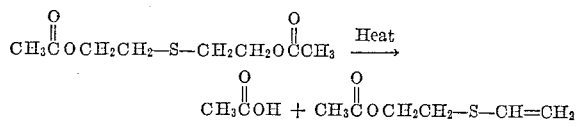

EXAMPLE 1

A vertically mounted 1-inch stainless steel tube 42 inches in length was equipped with a Dowtherm filled jacket, a mechanical metering pump connected through a feed line to the upper end of the tube, a thermocouple in the center, and an outlet line at the lower end of the tube leading through a condenser and receiver to a cold trap externally cooled with solid carbon dioxide. The tube was packed with 500 cubic centimeters (dry measure) of 4 x 8 mesh Filtros (low surface sintered glass and sand) as inert heat transfer agent. Three moles (618 grams) of 2,2'-thiodiethyl diacetate starting material was fed into the upper end of the tube at an average rate of 130 milliliters per hour while the temperature inside the packed tube was maintained between about 380° and 383° centigrade. At the end of the run, there were 580 grams of liquid material collected in the receiver. This material was distilled in a short, packed Claisen-type still to give three fractions: (1) 3 grams boiling in the range of from 40° to 70° centigrade at 10 millimeters of mercury absolute; (2) 15 grams boiling in the range of from 70° to 85° centigrade and at the same pressure; (3) 512 grams of starting material boiling in the range of from about 95° to 105° centigrade at 0.5 to 1 millimeter of mercury absolute; and 36 grams of undistilled residue. Fractions (1) and (2) were set aside while the recovered starting material (fraction (3)) was recycled through the same reaction tube under the same conditions at an average rate of 60 milliliters per hour. The 480 grams of receiver product obtained were distilled in the same manner as the initial product mass and 4 fractions were recovered: (1) 5 grams boiling at temperatures up to 70° centigrade at a pressure of 10 millimeters of mercury, absolute; (2) 35 grams boiling in the range of from 70° to 95° centigrade at 10 millimeters of mercury, absolute; (3) 28 grams boiling at temperatures up to about 90° centigrade and at a pressure of about 0.5 millimeter of mercury absolute; (4) 374 grams of starting material boiling in the range of from 95° to 105° centigrade at 0.5 millimeter of mercury, absolute; and 23 grams of undistilled residue. All fractions from both distillations, except for the recovered starting material, were combined and refractionated in a 20 millimeter by 4-inch packed column to give 47 grams of a liquid product boiling at 80.5° centigrade and 10 millimeters of mercury, absolute. Mass spectrometric, elemental and infrared analyses of this product showed that it contained 2-(vinylthio)ethyl acetate with minor amounts of associated impurities.

EXAMPLE 2

The equipment was the same as in Example 1, except that the Dowtherm was removed from the jacket to facilitate higher operating temperatures and the tube was refilled with fresh Filtros packing material. With the tube temperature maintained in the range of from about 460° to 470° centigrade, 765 grams (3.7 moles) of 2,2'-thiodiethyl diacetate was passed through at a constant rate of 50 milliliters per hour. The 741 grams of material collected in the receiver was distilled in a simple still to give a low-boiling fraction and a higher boiling fraction, the latter fraction constituting recovered starting material. The low boiling fraction was redistilled in a short column to give 106 grams of essentially pure 2-(vinylthio)ethyl acetate, 467 grams of unreacted starting material, and 80 grams of acetic acid along with some impurities.

The 2-(vinylthio)ethyl acetate product had the following properties:

| | |
|---|---|
| Boiling point (at 10 millimeters of mercury absolute) °C | 79.5 |
| Refractive index ($N_D$ at 30° centigrade) | 1.4805 |
| Elemental Analysis: | |
| Carbon— | |
|    Found percent | 48.9 |
|    Theoretical do | 49.3 |
| Hydrogen— | |
|    Found do | 7.1 |
|    Theoretical do | 6.85 |
| Sulfur— | |
|    Found do | 21.96 |
|    Theoretical do | 21.9 |

EXAMPLE 3

The same equipment and procedures as those in Example 2 were used except that the tube temperature was maintained in the range of from about 485° to 490° centigrade and the feed rate was 100 milliliters per hour. The receiver material was worked up as in Example 2 to give essentially pure 2-(vinylthio)ethyl acetate having a boiling point of 79.5° centigrade at 10 millimeters of mercury absolute. The saponification equivalent of this product was 143.5 as compared to a theoretical value of 146.

By using even higher temperatures and/or reduced feed rates one may, if desired, pyrolyze the starting material to such an extent as to remove two moles of acetic acid from each mole of starting material reacted, and thereby recover a product containing divinyl sulfide with substantially no 2-(vinylthio)ethyl acetate.

EXAMPLE 4

The equipment used in this example was the same as that described in Example 2, except that the tube was repacked with fresh Filtros. About 1500 grams (7.28 moles) of 2,2'-thiodiethyl diacetate starting material were fed to the tube at a rate of 95 milliliters per hour while maintaining the tube temperature in a range of from about 460° to 465° centigrade. The 1336 grams of material collected in the receiver was worked up as described in Example 2 to give 282 grams (30.1 percent yield; 50.3 percent efficiency) of essentially pure 2-(vinylthio)ethyl acetate, boiling at 79° centigrade and 10 millimeters of mercury absolute, and having a refractive index ($N_D$) at 30° centigrade of from 1.4802 to 1.4805.

EXAMPLE 5

*Preparation of Methyl Vinyl Sulfide*

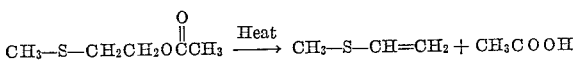

The equipment was the same as described in Example 2 and the tube was refilled with fresh Filtros as inert packing material. The temperature of the tube was raised to about 460° centigrade and maintained in the range of from about 455 to 465° centigrade while 975 grams (7.2 moles) of 2-(methylthio)ethyl acetate was fed at a constant rate of 105 milliliters per hour. There was recovered 920 grams of receiver material which was fractionated in a packed column to yield 122 grams of crude methyl vinyl sulfide, 52 grams of acetic acid, and 692 grams of starting material. The recovered starting material was recycled through the tube under the same conditions and yielded 618 grams of receiver material. The second batch of receiver material was distilled in the same manner as the prior batch to give 148 grams of crude methyl vinyl sulfide, 80 grams of acetic acid and 292 grams of the 2-(methylthio)ethyl acetate starting material. The initial fractions from each of the above distillations were combined and redistilled, yielding 129 grams (24 percent yield) of product, which was shown by infrared analysis and determination of sulfur content to be methyl vinyl sulfide.

In a similar manner as that shown in the above examples it is possible to prepare numerous other vinyl thioethers such as, for example, ethyl vinyl sulfide, propyl vinyl sulfide, butyl vinyl sulfide, isobutyl vinyl sulfide, phenyl vinyl sulfide, tolyl vinyl sulfide, benzyl vinyl sulfide, and the like.

What is claimed is:

1. A process for producing vinyl thioethers which comprises heating a 2-(organothio)ethyl acetate starting material of the general formula:

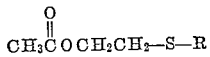

wherein R is an organic radical selected from the group consisting of alkyl, aryl, and acetoxyethyl radicals, to a pyrolysis temperature greater than about 350° centigrade; maintaining the said starting material above said temperature for a period of time sufficient to at least partially pyrolyze the same, thereby forming acetic acid and a vinyl thioether; and recovering the vinyl thioether from the product mass.

2. The process of claim 1 wherein the starting material is maintained at a temperature within the range of from about 390° to about 490° centigrade.

3. The process of claim 1 wherein the starting material is maintained at a temperature within the range of from about 450° to about 470° centigrade.

4. The process of claim 1 wherein the vinyl thioether is recovered by fractional distillation of the product mass.

5. The process of claim 2 wherein the vinyl thioether is recovered by factional distillation of the product mass.

6. A continuous process for producing vinyl thioethers of the general formula:

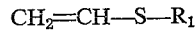

wherein $R_1$ is an organic radical selected from the group consisting of alkyl, aryl, vinyl, and acetoxyethyl radicals which comprises maintaining a reaction zone at a pyrolysis temperature greater than about 350° centigrade; continuously feeding into said reaction zone a 2-(organothio)-ethyl acetate starting material of the general formula:

wherein R is an organic radical selected from the group consisting of alkyl, aryl, and acetoxyethyl radicals; retaining the said starting material in said reaction zone for a period of time sufficient to at least partially pyrolyze the same, thereby forming acetic acid and a vinyl thioether; continuously collecting the reaction products exiting from said reaction zone; and recovering the vinyl thioether portion of the product mass.

7. The process of claim 6 wherein the vinyl thioether is recovered from the product mass by fractional distillation.

8. The process of claim 7 wherein the excess 2-(organothio)ethyl acetate starting material obtained in the fractional distillation recovery step is recycled to the reaction zone.

9. A continuous process for preparing vinyl thioethers of the general formula:

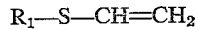

wherein $R_1$ is an organic radical selected from the group consisting of alkyl, aryl, vinyl and acetoxyethyl radicals which comprises at least partially filling a reaction zone with an inert packing material; maintaining said reaction zone at a pyrolysis temperature greater than about 350° centigrade; continuously feeding into said reaction zone a 2-(organothio)ethyl acetate of the general formula:

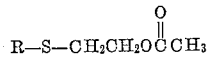

wherein R is an organic radical selected from the group consisting of alkyl, aryl and acetoxyethyl radicals, said feeding being conducted at a rate in the range of from about 50 grams to about 400 grams of starting material per hour per liter of packing material; continuously collecting the vinyl thioether, acetic acid and unreacted starting material exiting from said packed reaction zone and recovering the vinyl thioether produced.

10. The process of claim 9 wherein the feeding is conducted at a rate in the range of from about 100 grams to about 300 grams of starting material per liter of packing material per hour.

11. The process of claim 10 wherein the temperature of the packed reaction zone is maintained between about 390° centigrade and 490° centigrade.

12. The process of claim 11 wherein the reaction zone is maintained at a temperature between about 450° and about 470° centigrade.

13. The process of claim 11 wherein the unreacted starting material obtained in the fractional distillation recovery step is recycled to the reaction zone.

14. The process of claim 11 wherein the 2-(organothio)ethyl acetate starting material is 2-(methylthio)ethyl acetate and the recovered vinyl thioether product is methyl vinyl sulfide.

15. A process for producing 2-(vinylthio)ethyl acetate which comprises heating 2,2'-thiodiethyl diacetate having the formula:

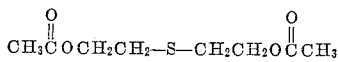

to a pyrolysis temperature greater than about 350° C., maintaining said sulfide above said pyrolysis temperature for a period of time sufficient to at least partially pyrolyze the same, thereby forming 2-(vinylthio)ethyl acetate and acetic acid; and recovering said 2-(vinylthio)ethyl acetate from the product mass.

16. A process for producing divinyl sulfide which comprises heating 2,2'-thiodiethyl diacetate having the formula:

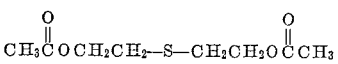

to a pyrolysis temperature greater than about 490° C.; maintaining said sulfide above said pyrolysis temperature for a period of time sufficeint to at least partially pyrolyze the same, thereby forming divinyl sulfide and acetic acid; and recovering said divinyl sulfide from the product mass.

17. A continuous process for preparing 2-(vinylthio)-ethyl acetate which comprises at least partially filling a reaction zone with an inert packing material; maintaining said reaction zone at a pyrolysis temperature greater than about 350° C.; continuously feeding into said reaction zone 2,2'-thiodiethyl diacetate having the formula

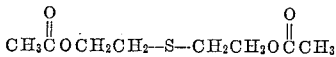

said feeding being conducted at a rate in the range of from about 50 grams to about 400 grams of starting material per hour, per liter of packing material; continuously collecting said 2-(vinylthio)ethyl acetate, acetic acid and unreacted sulfide exiting from said packed reaction zone, and recovering the 2-(vinylthio)ethyl acetate produced.

18. A continuous process for preparing divinyl sulfide which comprises at least partially filling a reaction zone with an inert packing material; maintaining said reaction zone at a pyrolysis temperature greater than about 490° C.; continuously feeding into said reaction zone 2,2'-thiodiethyl diacetate having the formula:

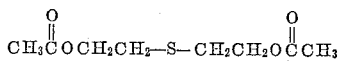

said feeding being conducted at a rate in the range of from about 50 grams to about 400 grams of starting material per hour, per liter of packing material; continuously collecting said divinyl sulfide, acetic acid and unreacted 2,2'-thiodiethyl diacetate exiting from said packed reaction zone; and recovering the divinyl sulfide produced.

19. Process as defined in claim 6 wherein the 2-(organothio)ethyl acetate is fed into the reaction zone at a rate of about 25 grams to about 200 grams per hour, per liter of reactor volume.

References Cited in the file of this patent

UNITED STATES PATENTS 2,906,741   Hwa ------------------ Sept. 29, 1959

OTHER REFERENCES

Houtman et al.: Rec. Trav. Chim. 65, 781–788 (1946).